US009426209B2

(12) United States Patent
Marar et al.

(10) Patent No.: US 9,426,209 B2
(45) Date of Patent: Aug. 23, 2016

(54) UPLOAD/DOWNLOAD OF MOBILE APPLICATIONS USING A MIME REPOSITORY

(71) Applicants: Mohan Marar, Kerala (IN); Aswin Kumar Jayaraman, Chennai (IN); Naveed Mohammed B, Bangalore (IN); Raghavendra Rao M G, Bangalore (IN)

(72) Inventors: Mohan Marar, Kerala (IN); Aswin Kumar Jayaraman, Chennai (IN); Naveed Mohammed B, Bangalore (IN); Raghavendra Rao M G, Bangalore (IN)

(73) Assignee: SAP SE, Walldorf (DE)

( * ) Notice: Subject to any disclaimer, the term of this patent is extended or adjusted under 35 U.S.C. 154(b) by 471 days.

(21) Appl. No.: 13/787,166

(22) Filed: Mar. 6, 2013

(65) Prior Publication Data

US 2014/0136654 A1 May 15, 2014

(30) Foreign Application Priority Data

Nov. 12, 2012 (IN) .............................. 4744CHE2012

(51) Int. Cl.
*G06F 15/16* (2006.01)
*H04L 29/08* (2006.01)
*H04L 29/06* (2006.01)

(52) U.S. Cl.
CPC ............... *H04L 67/10* (2013.01); *H04L 29/06* (2013.01); *H04L 29/08072* (2013.01)

(58) Field of Classification Search
CPC .. H04L 67/10; H04L 29/06; H04L 29/08072
USPC ........................................................ 709/217
See application file for complete search history.

(56) References Cited

U.S. PATENT DOCUMENTS

| | | | |
|---|---|---|---|
| 6,990,514 B1 * | 1/2006 | Dodrill | G06F 17/30914 707/E17.124 |
| 7,353,044 B2 * | 4/2008 | Nachef | 455/558 |
| 7,716,276 B1 * | 5/2010 | Ren et al. | 709/203 |
| 8,458,363 B2 * | 6/2013 | Rosenblatt | G06F 17/30058 709/248 |
| 8,706,800 B1 * | 4/2014 | Ahmed | G06F 9/468 709/201 |
| 2002/0129129 A1 * | 9/2002 | Bloch | G06F 8/61 709/220 |
| 2004/0034624 A1 * | 2/2004 | Deh-Lee et al. | 707/3 |
| 2004/0252966 A1 * | 12/2004 | Holloway et al. | 386/46 |
| 2006/0112188 A1 * | 5/2006 | Albanese et al. | 709/238 |
| 2006/0173867 A1 * | 8/2006 | Gaucas et al. | 707/100 |
| 2006/0217126 A1 * | 9/2006 | Sohm et al. | 455/454 |
| 2007/0171923 A1 * | 7/2007 | Eisner | G06F 9/546 370/401 |
| 2007/0260616 A1 * | 11/2007 | Shen | 707/100 |
| 2008/0148407 A1 * | 6/2008 | Katkar | 726/24 |
| 2008/0195664 A1 * | 8/2008 | Maharajh | G06F 17/30035 |
| 2009/0162828 A1 * | 6/2009 | Strachan | G06F 17/30056 434/350 |
| 2009/0210702 A1 * | 8/2009 | Welingkar et al. | 713/156 |
| 2009/0282403 A1 * | 11/2009 | Poole et al. | 717/178 |
| 2010/0058321 A1 * | 3/2010 | Anderson et al. | 717/173 |

(Continued)

*Primary Examiner* — Razu A Miah
(74) *Attorney, Agent, or Firm* — Schwegman Lundberg & Woessner, P.A.

(57) ABSTRACT

A system is configured to maintain a plurality of mobile applications in the computer storage device and to maintain a Multipurpose Internet Mail Extensions (MIME) repository in the computer storage device. The system uploads a new mobile application from a user interface to the computer storage device, and stores the new mobile application in to the MIME repository. The system identifies a uniform resource locator for the new mobile application based on a type of operating system on which the mobile application will execute, and retrieves system specific information for the URL from the MIME repository. The system retrieves the new mobile application from the MIME repository by selecting the URL and transferring the new mobile application over-the-air to a user device.

20 Claims, 4 Drawing Sheets

(56) References Cited

U.S. PATENT DOCUMENTS

| | | |
|---|---|---|
| 2010/0070606 A1* | 3/2010 | Shenfield et al. ............ 709/217 |
| 2011/0191841 A1* | 8/2011 | Corda et al. ...................... 726/9 |
| 2011/0276961 A1* | 11/2011 | Johansson et al. ........... 717/178 |
| 2012/0089706 A1* | 4/2012 | Collins et al. ................ 709/219 |
| 2012/0117120 A1* | 5/2012 | Jacobson et al. ............. 707/793 |
| 2012/0214441 A1* | 8/2012 | Raleigh ............ G06Q 10/06375 455/406 |
| 2013/0014258 A1* | 1/2013 | Williams ................ G06Q 50/01 726/24 |
| 2013/0054674 A1* | 2/2013 | Myers .................... H04L 67/34 709/203 |
| 2013/0173734 A1* | 7/2013 | Oteiza Lacalle . G06F 17/30867 709/207 |

\* cited by examiner

UPLOAD/DOWNLOAD OF MOBILE APPLICATIONS USING A MIME REPOSITORY

The present patent application claims the priority benefit of the filing date of Indian Provisional Application No. 4744CHE2012 filed Nov. 12, 2012, entitled "Over-The-Air Installation and Download and Upload of Mobile Applications."

TECHNICAL FIELD

The present disclosure, relates to mobile applications, and in an embodiment, but not by way of limitation, the uploading and downloading of mobile applications using a MIME, (Multipurpose Internet Mail Extension) repository.

BACKGROUND

Storing and retrieving of mobile application (mobile app) installables, especially over-the-air (OTA) installations, are costly endeavors. Currently, some available software can store and retrieve mobile apps, but such software is still not very efficient or effective at achieving an over-the-air upload and/or install (download) of the mobile apps.

DETAILED DESCRIPTION

Figure 1:
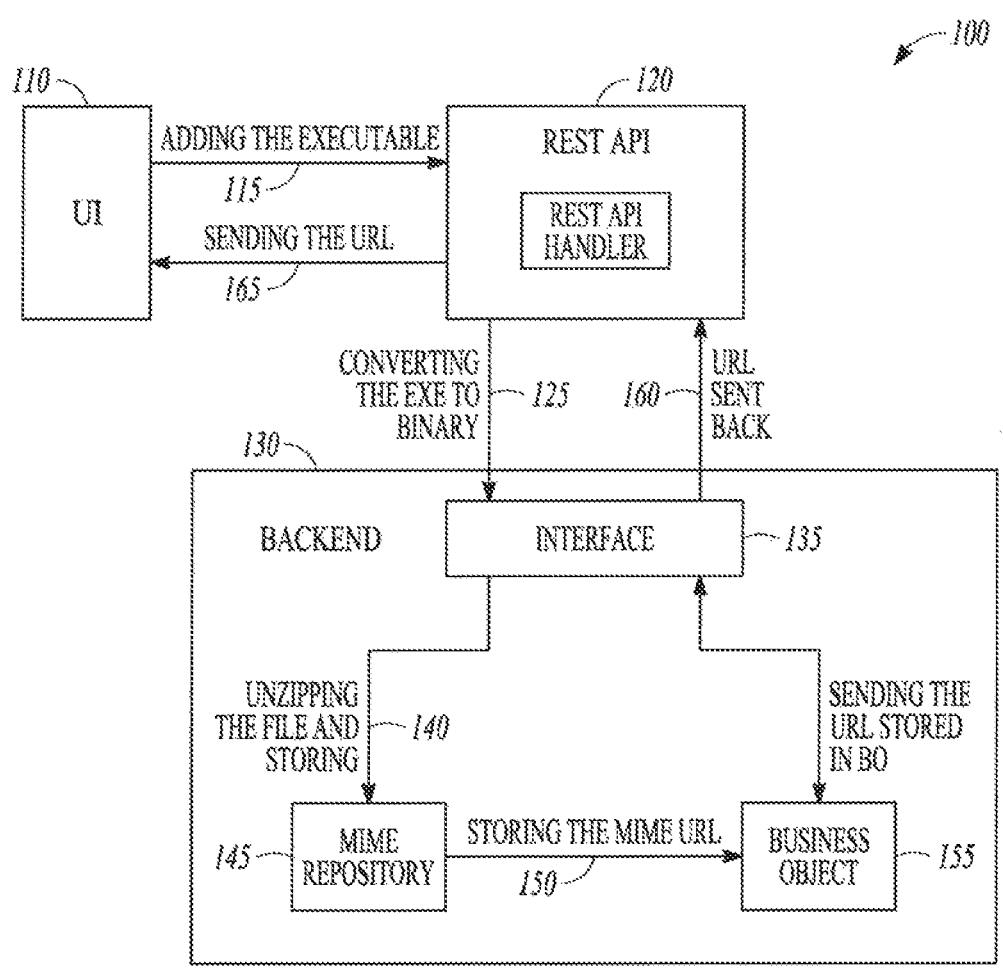
FIG. 1 is a block diagram of an example embodiment of a system and process for adding a mobile application solution to a Multipurpose Internet Mail Extension (MIME) repository.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, arc not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of invention. The following detailed description is, therefore, not to be taken in a limiting sense, and the scope of the present invention is defined only by the appended claims, appropriately interpreted, along with the full range of equivalents to which the claims are entitled, in the drawings, like numerals refer to the same or similar functionality throughout the several views.

In general, one or more embodiments on the present disclosure relate to over-the-air (OTA) installation and upload of mobile apps using a Multipurpose Internet. Mail Extension (MIME) repository, The MIME repository can be part of a general store of applications of a software development company or other software vendor. In such embodiments, the general store of applications relates to a store of business solutions wherein access to these business solutions is restricted to the employees of the software vendor's customer. The store of solutions can have several functionalities. The customer can purchase solutions and licenses for the solutions and partner products at the overall store and add these purchased solutions to the company catalog for internal distribution. The customer can add self-developed solutions to the company catalog. The customer end user can "purchase" from the internal catalog, i.e. install the app and consummate a license from the apps that the company customer bought.

With such a store of applications, the customer gets a control center for self services concerning catalog management, user administration and device management, purchasing additional licenses, and workflow handling. In combination with mobile device management (MDM) software, the company store has a fully integrated app and device management system.

In an embodiment, all mobile installables are stored only in the MIME repository. The mobile installables can be stored in an octet stream with a mobile installable-supported mobile extension (e.g., .ipa, .plist, or .jad). A Zip file of mobile installables is uploaded, irrespective of its file type (.los, .apk, or .jad), and based on the user selection, the file is retrieved. A mobile device, is detected when a user clicks on an installable link, and in particular, a device is detected and matched with the maintained version of the details of the operating of the device and the tile is downloaded to the device.

FIG. 1 is a block diagram of an example embodiment of a system and process 100 for adding a mobile application solution to a Multipurpose Internet Mail Extension (MIME) repository. In an embodiment, a user who has created a new mobile application that he or she would like to upload to a MIME repository invokes user interface 110 to upload the mobile app executable 115 to a representational state transfer application program interface (REST API) 120. The mobile app executable is the platform specific (e.g., iPhone) mobile app installable The mobile app executable is transmitted to the REST API 120 as art octet data stream in a zipped format. The REST API 120 converts the mobile app executable to binary at 125, and then transmits it to an interface 135 of a backend 130.

The interface 135 unzips the binary content in the ZIP file, and stores it in the MIME repository 145. The MIME repository 145 is used to store all MIME objects (e.g. style sheets, graphics, and icons). MIMEs are created as objects and can be referred to as part of different application technologies. The MIME repository 145 can be displayed in a browser, wherein all MIME objects are arranged hierarchically in directories of a tree. A uniform resource locator (URI) is assigned to this mobile app in the MIME repository, and at 150, the URL associated with the mobile app is stored in an associated business object 155. The URL is transmitted back to the user interface 110 at 160 via the REST API 120. This informs the user who uploaded the mobile app to the MIME repository of the successful upload of the mobile app and the URL that is associated with his or her mobile app.

Figure 2:
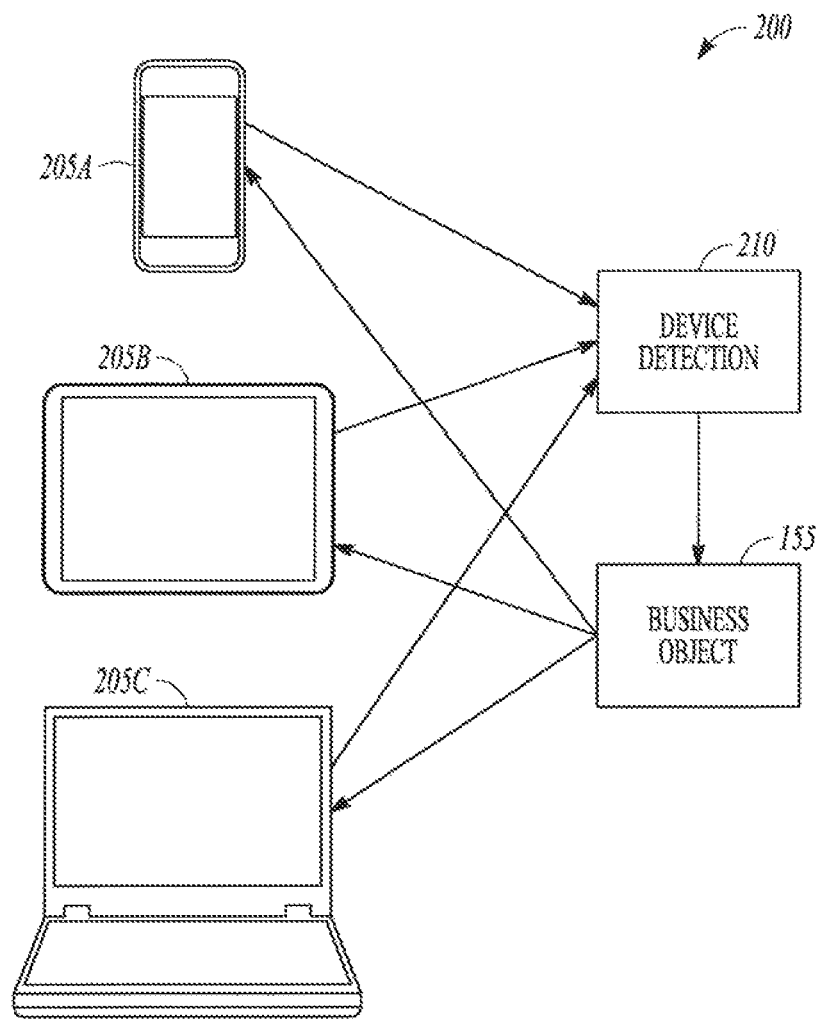
FIG. 2 is a block diagram of an example embodiment of a system and process for repository.

FIG. 2 is a block diagram of an example embodiment of a system and process 200 for retrieving a mobile application from a MIME repository. Specifically, the MIME repository 145 can be accessed from any mobile or non-mobile device such as a smartphone 205A, a tablet 205B, or a laptop/desktop 205C. Using, the mobile device 205A, 205B, or 205C, a user clicks on a download icon, which is associated with the URL generated in step 150 of FIG. 1, and the device is detected at 210. Using the over-the-air retrieval file in the MIME repository 145 and business object 155, the mobile app is transmitted to the mobile device.

Figure 3:
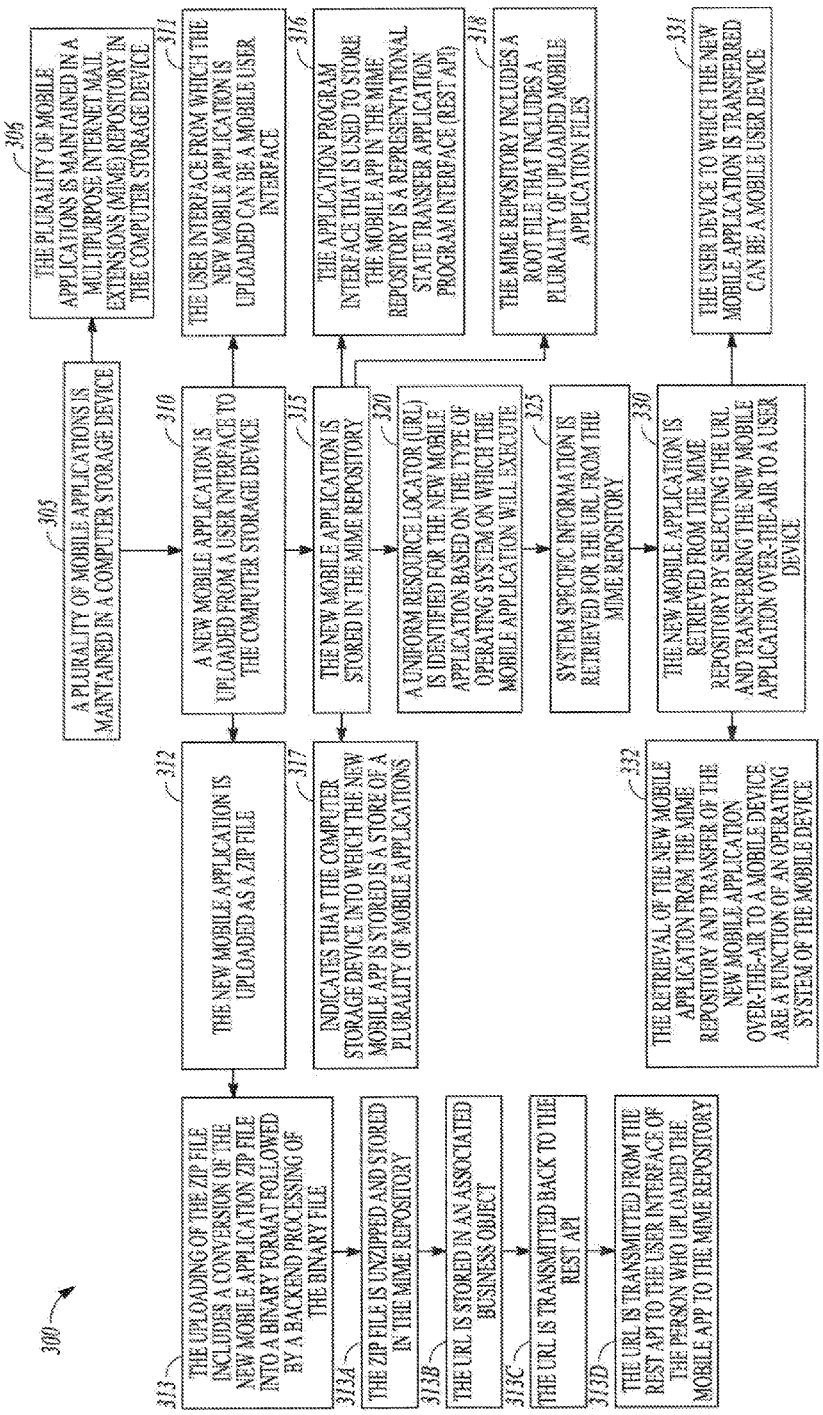
FIG. 3 is a flowchart-like diagram of an example embodiment of steps and features of a process and system to execute an over-the-air (OTA) upload of mobile application to a MIME repository and an over-the-air download of the mobile application from the MIME repository.

FIG. 3 is a flowchart-like diagram of features and steps of an example system and process 300 for uploading and downloading a mobile application using a MIME repository. The MIME repository can be an Advanced Business Application Programming (ABAP) MIME repository. FIG. 3 includes a number of process blocks 305-332. Though arranged serially in the example of FIG. 3, other examples may reorder the blocks, omit one or more blocks, and/or execute two or more blocks in parallel using, multiple processors or a single processor organized as two or more virtual machines or subprocessors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 3, at 305, a plurality of mobile applications is maintained in a computer storage device. More specifically, as indicated at 306, the plurality of mobile applications is maintained in a Multipurpose Internet Mail Extensions (MIME) repository in the computer storage device. As noted above, in an embodiment, the MIME repository is an ABAP MIME repository. These mobile applications are uploaded into the MIME repository 145 (usually from a mobile device) and then downloaded from the MIME repository onto mobile user devices as follows.

At 310, a new mobile application is uploaded from a user interface to the computer storage, device. The term "new" refers to a mobile application that is not currently one of the plurality of mobile applications stored in the MIME repository 145, but a mobile application that will be added to the MIME repository 145. At 315, the new mobile application is stored in the MIME repository 145. This act of storing the new mobile application is done by a user (perhaps the creator of the new mobile application) using an application user interface on his or her mobile device.

At 320, a uniform resource locator (URL) is identified for the new mobile application based on the type of operating system on which the mobile application will execute. The purpose of the URL is to trigger the over the air installation of the mobile app. A catalog of solutions and a download button is displayed to the end user. The end user clicks the download button, and the URL information is completely abstracted for the end user. The URLs are formulated for each different mobile platform based on the configurations of the mobile platforms, and the URUs are formulated to trigger the over the air download. At 325, system specific information is retrieved for the URI, from the MIME repository. The system specific information includes the particular mobile platform and metadata associated with the mobile application/solution.

More specifically, for each type of mobile device operating system, the REST API 120 returns a unique URL back to the upload user interface 110 for further processing. The further processing includes determining if the detected device is a desktop. If the detected device is a desktop, then the desktop will download the file. If the detected device is a mobile device, then the mobile device will prepare itself for the direct install. This unique URL is associated with a particular file for the particular mobile device operating system. These unique files can have a particular file extension. For example, if the mobile device, operating system is an iPhone, it can return a the with a .plist extension, if the mobile device operating system is an Android, it can return a file with a .apk extension, and if the mobile device operating system is a Blackberry, it can return a file with a .jad extension. These files are device specific files that are required for the over the air installation. Once the relative URI, path is returned from the REST API 120, the upload user interface 110 processes this relative URL path by updating this relative URL path in the business object 155. It should be noted that at this point the URL that is stored in the business object 155 is very generic and does not contain any system specific information. The URL gets the system specific information when the URL is retrieved from the MIME repository when it is downloaded onto a user's mobile device.

At 330, the new mobile application is retrieved from the MIME repository by selecting the URL and transferring the new mobile application over-the-air to a user device. This can be referred to as the downloading of the mobile app to the device of a user Who would like to use the mobile app. The download is initiated by a simple click of the URL that was assigned in this mobile application in the process of uploading the mobile app to the MIME repository.

Block 331 indicates that the user device to which the new mobile application is transferred can be a mobile user device. Block 311 indicates that the user interface from which the new mobile application is uploaded can be a mobile user interface.

At 312, the new mobile application is uploaded as a ZIP file. The ZIP file includes a folder having a name of the new mobile application and an installable of the new mobile application. At 313, the uploading of the ZIP file includes a conversion of the new mobile application ZIP file into a binary format followed by a backend processing of the binary file.

At 316, the application program interface that is used to store the mobile app in the MIME repository is a representational state transfer application program interface (REST API).

The backend process on the binary ale includes several steps. Starting at 313A, the ZIP file is unzipped and stored in the MIME repository 145. At 313B, the URL is stored in an associated business object 155. For example, if the mobile app is an accounting-based app, the mobile app may be associated with one or more business objects of an accounting department of a business organization. At 313C, the URL is transmitted back to the REST API 120, and at 313D, the URL is transmitted from the REST API 120 to the user interface 110 of the person who uploaded the mobile app to the MIME repository 145. This informs the person who uploaded the mobile app of the successful completion of the upload process and the URL that is now associated with the uploaded app.

Block 317 indicates that the computer storage device into which the new mobile app is stored is a store of a plurality of mobile applications. In an embodiments, this store of mobile apps is created and maintained by a software development company, and these mobile apps are available to the customers of the software development company via licensing agreements and can be used by one or more individual and corporate users. At 318, the MIME repository 145 includes a root file that includes a plurality of uploaded mobile application At 332, the retrieval of the new mobile application from the MIME repository 145 and transfer of the new mobile application over-the-air to a mobile device are a function of an operating system of the mobile device. For example, if the person who is downloading the new mobile application has an Android platform, then the URL related to the Android platform for this particular mobile app is retrieved, and the mobile app suited for the Android platform is downloaded to the user's Android.

The following are examples of the upload/download of mobile apps in connection with an iPhone platform, an Android platform, and a Blackberry platform.

For an Android app, the developer creates a folder with the App name. The Android App .apk file is put into the created folder. The folder is zipped and named with the same App name. The zip file is uploaded by clicking on a browse button on the user interface 110. Upon completion of the upload, the developer will see the .apk file name next to the browse button confirming that the zip file has been successfully uploaded.

For an iPhone app, a folder with the App name is created. The file and the OTA .plist file are placed into the created folder. The folder is zipped and named with the same App name. The Zip file is uploaded by clicking on the Browse button. Once the Zip file is successfully uploaded, the developer will see .plist file name next to the browse button confirming the zip file successfully uploaded.

Figure 4:
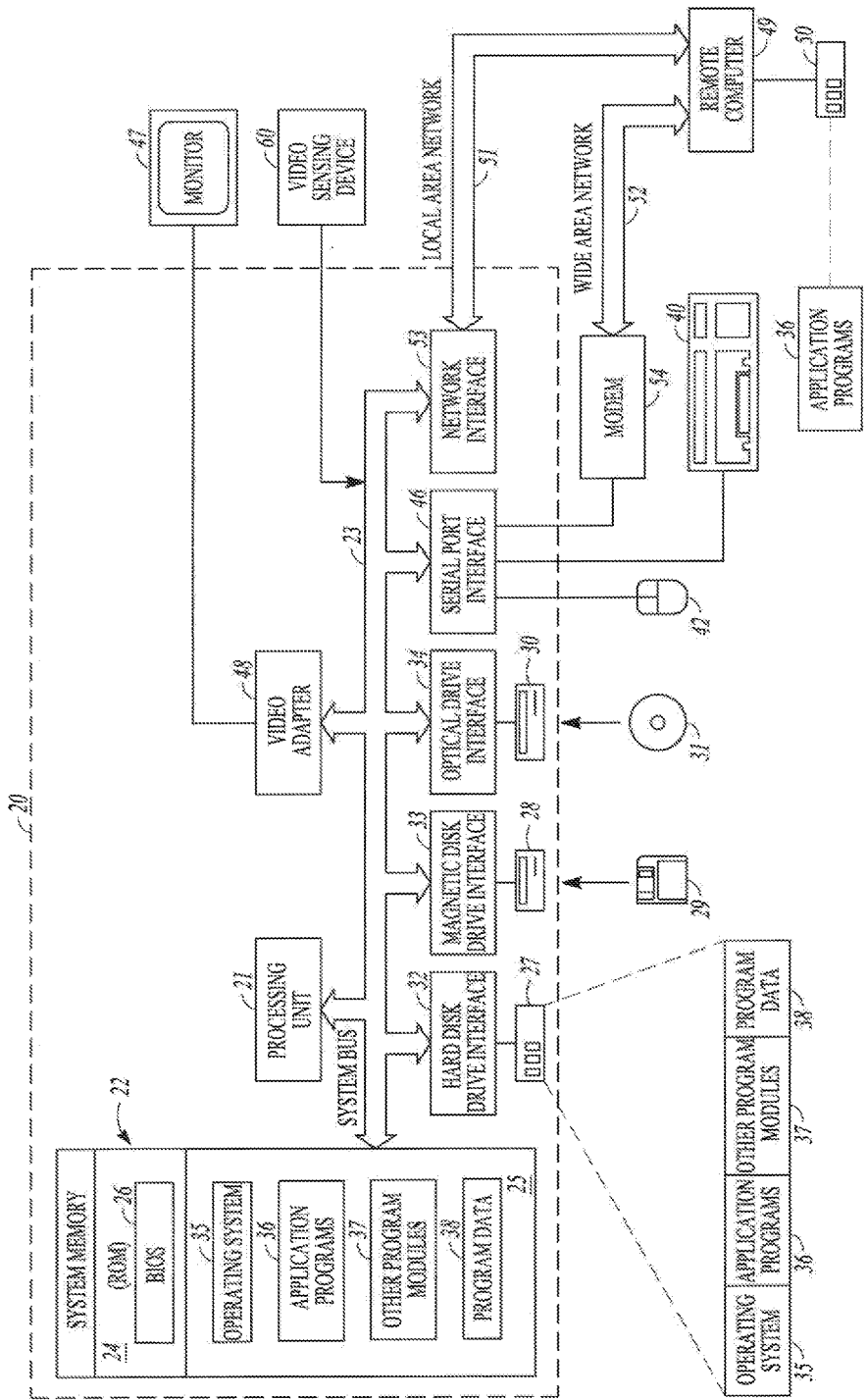
FIG. 4 is a block diagram of an example embodiment of a computer system upon which, and/or in connection with which, one or more embodiments of the present disclosure can execute.

For a Blackberry app, a folder with the App name is created. The Blackberry files are put into the created folder. The folder is zipped and named with the same App name. The Zip file is uploaded by clicking the browse button. Once the Zip file is uploaded, the developer will see the .jad file name next to the browse button, thereby confirming that the Zip file successfully uploaded. The developer should go to the web folder and edit .jad file, which is the main Blackberry installable file which contains references to the .cod file. The developer should then replace the RIM-COD-URL parameter with the absolute link that points to the Cod files. The absolute link should follow the format of the URL https://<domain name>/sap/cp/ui/esdownloads/<foldername (insidezip)>/<filename>.cod FIG. 4 is an overview diagram of hardware and an operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including, a memory bus or memory controller, a peripheral bus, and a local bus using any of a variety of bus architectures. The system memory can also be referred to as simply the memory, and in some embodiments, includes read-only Memory (ROM) 24 and random-access memory (RAM) 25. A basic input/output system (BIOS) program 26, containing the basic routines that help to transfer information between elements within the computer 20, such as during start-up, may be stored in ROM 24, The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks. Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as is video adapter 48. The monitor 47 can display a graphical user interface for the user. In addition to the monitor 47, computers typically include, other peripheral output devices (not shown), such as speakers and printers, The computer 20 may operate in a networked environment using logical connections to one or more remote computers or servers, such as remote computer 49. These logical connections are achieved by a communication device coupled to or a pan of the computer 20; the invention is not limited to a particular type of communications device. The remote computer 49 can be another computer, a server, a router, a network. PC, a client, a peer device or other common network node, and typically includes many or all of the elements described above I/O relative, to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices jar, establishing a communications link between the computers may be used including hybrid fiber coax connections, T1-T3 lines, DSL's, OC-3 and/or OC-12. TCP/IP, microwave, wireless application protocol, and any other electronic media through any suitable switches, routers, outlets and power lines, as the same are known and understood b one of ordinary skill in the art.

Thus, an example system, method and machine readable medium for using software neural networks for determining, relationships among software objects have been described. Although specific example embodiments have been described, it will he evident that various modifications and changes may be made to these embodiments without departing-from the broader spirit and scope of the invention. Accordingly, the specification and drawings are to regarded in an illustrative rather than a restrictive sense. The accompanying drawings that form a part hereof, show by way of illustration, and not of limitation, specific embodiments in which the subject matter maybe practiced. The embodiments illustrated are described in sufficient detail to enable those skilled in the art to practice the teachings disclosed herein. Other embodiments may be utilized and derive therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention ea inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, be apparent to those of skill in the art upon reviewing the above description.

The Abstract is provided to comply with 37 .F.R. §1.72(b) and will allow the reader to quickly ascertain the nature and gist of the technical disclosure. It is submitted with understanding that it will not be used to inter p it limit the scope or meaning of the claims.

In the foregoing description of the embodiments, various features are, grouped together in a single embodiment for the purpose of streamlining the disclosure. This method of disclosure is to be interpreted as reflecting that the claimed embodiments have more features than are expressly ed ach claim. Rather, as the following claims reflect, inventive subject matter lies in less, than all features of a single disclosed embodiment. Thus the following claims are hereby incorporated into the Description of the Embodiments, with each claim standing omits own as a separate example embodiment.

The invention claimed is:

1. A system comprising:
a computer processor and a computer storage device operable to:
maintain a plurality of mobile applications in the computer storage device;
maintain a Multipurpose Internet Mail Extensions (MIME) repository in the computer storage device;
upload a new mobile application from a user interface to the computer storage device;
store, using an application program interface, the new mobile application in the MIME repository;
identify a uniform resource locator (URL) for the new mobile application based on a type of operating system on which the mobile application will execute;
retrieve system specific information for the URL from the MIME repository; and
retrieve the new mobile application from the MIME repository by selecting the URL and transfer the new mobile application over-the-air to a user device.

2. The system of claim 1, wherein the user device comprises a mobile user device.

3. The system of claim 1, wherein the user interface from which the new mobile application is uploaded comprises a mobile user interface.

4. The system of claim 1, wherein the uploaded new mobile application comprises a ZIP file, the ZIP file comprising a folder having a name of the new mobile application and an installable of the new mobile application.

5. The system of claim 4, wherein the upload of the ZIP file comprises a conversion of the new mobile application ZIP file to a binary format and a backend processing of the binary file.

6. The system of claim 5, wherein the application program interface comprises a representational state transfer application program interface (REST API).

7. The system of claim 5, wherein the backend processing comprises:
  unzipping the ZIP file and storing the unzipped ZIP file in the MIME repository;
  storing the URL in an associated business object;
  transmitting the URL back to the REST API; and
  transmitting the URL from the REST API to the user interface.

8. The system of claim 1, wherein the computer storage device comprises a store of a plurality of mobile applications for licensing or use by one or more individual and corporate users.

9. The system of claim 1, wherein the MIME repository comprises a root file comprising a plurality of uploaded mobile application files.

10. The system of claim 1, wherein the retrieval of the new mobile application from the MIME repository and transfer of the new mobile application over-the-air to a mobile device are a function of an operating system of the mobile device.

11. A process comprising:
  maintaining a plurality of mobile applications in a computer storage device;
  maintaining a Multipurpose Internet Mail Extensions (MIME) repository in the computer storage device;
  uploading a new mobile application from a user interface to the computer storage device;
  storing, using an application program interface, the new mobile application in the MIME repository;
  identifying a uniform resource locator (URL) for the new mobile application based on a type of operating system on which the mobile application will execute;
  retrieving system specific information for the URL from the MIME repository; and
  retrieving the new mobile application from the MIME repository by selecting the URL and transferring the new mobile application over-the-air to a user device.

12. The process of claim 11, wherein the uploaded new mobile application comprises a ZIP file, the ZIP file comprising a folder having a name of the new mobile application and an installable of the new mobile application; and
  wherein the uploading of the ZIP file comprises converting the new mobile application ZIP file to a binary format and processing of the binary file in a backend system.

13. The process of claim 12, wherein the processing of the binary file in the backend system comprises:
  unzipping the ZIP file and storing the unzipped ZIP file in the MIME repository;
  storing the URL in an associated business object;
  transmitting the URL back to the representational state transfer application program interface (REST API); and
  transmitting the URL from the REST API to the user interface.

14. The process of claim 11, wherein the retrieving of the new mobile application from the MIME repository and the transferring of the new mobile application over-the-air to a mobile device are a function of an operating system of the mobile device.

15. A computer readable storage device comprising instructions that when executed by a processor executes a process comprising:
  maintaining a plurality of mobile applications in a computer storage device;
  maintaining a Multipurpose Internet Mail Extensions (MIME) repository in the computer storage device;
  uploading a new mobile application from a user interface to the computer storage device;
  storing, using an application program interface, the new mobile application in the MIME repository;
  identifying a uniform resource locator (URL) for the new mobile application based on a type of operating system on which the mobile application will execute;
  retrieving system specific information for the URL from the MIME repository; and
  retrieving the new mobile application from the MIME repository by selecting the URL and transferring the new mobile application over-the-air to a user device.

16. The computer readable storage device of claim 15, wherein the uploaded new mobile application comprises a ZIP file, the ZIP file comprising a folder having a name of the new mobile application and an installable of the new mobile application; and
  wherein the uploading of the ZIP file comprises converting the new mobile application ZIP file to a binary format and processing of the binary file in a backend system.

17. The computer readable storage device of claim 15, wherein the processing of the binary file in the backend system comprises:
  unzipping the ZIP file and storing the unzipped ZIP file in the MIME repository;
  storing the URL in an associated business object;
  transmitting the URL back to the representational state transfer application program interface (REST API); and
  transmitting the URL from the REST API to the user interface.

18. The computer readable storage device of claim 15, wherein the retrieving of the new mobile application from the MIME repository and the transferring of the new mobile application over-the-air to a mobile device are a function of an operating system of the mobile device.

19. The computer readable storage device of claim 15, wherein the user device comprises a mobile user device.

20. The computer readable storage device of claim 15, wherein the user interface from which the new mobile application is uploaded comprises a mobile user interface.

* * * * *